Dec. 3, 1963  C. H. WORSHAM  3,113,049
DIRECT PRODUCTION OF ELECTRICAL ENERGY FROM LIQUID FUELS
Filed Jan. 3, 1961
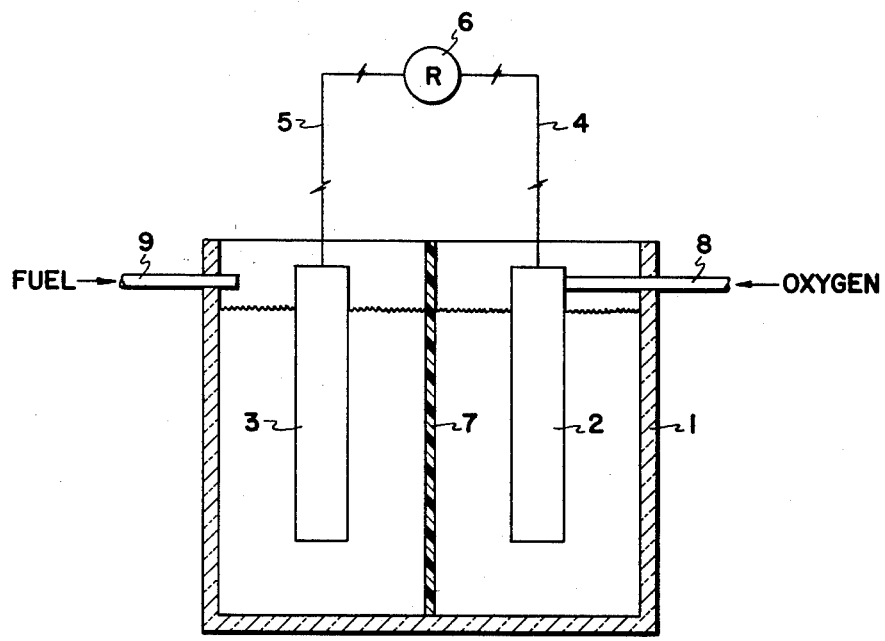
Charles H. Worsham INVENTOR
BY Alvin B. Johnson
PATENT ATTORNEY

United States Patent Office 3,113,049
Patented Dec. 3, 1963

3,113,049
DIRECT PRODUCTION OF ELECTRICAL ENERGY FROM LIQUID FUELS
Charles H. Worsham, Fanwood, N.J., assignor to Esso Research and Engineering Company, a corporation of Delaware
Filed Jan. 3, 1961, Ser. No. 80,194
3 Claims. (Cl. 136—86)

This invention relates to methods for increasing electrochemical oxidation of an organic fuel in a process wherein electrical energy is a product of such oxidation. In particular, this invention relates to the production and recovery of electrical energy in a fuel cell employing an electrolyte-fuel solution comprising an aqueous sulfuric acid electrolyte and a liquid organic fuel. More particularly, this invention relates to increasing the rate of production with such cell when the soluble liquid fuel is methanol.

This application is a continuation-in-part of application Serial No. 26,190, filed May 2, 1960.

Fuel cells for the direct production of electrical energy from liquid fuels are known. Such cells ordinarily comprise at least one fuel electrode and at least one oxygen electrode, either an electrolyte extending from a fuel electrode to an oxygen electrode or an anolyte in contact with a fuel electrode and in ion-exchange with a catholyte in contact with an oxygen electrode, means for passing a liquid fuel into dual contact with electrolyte and fuel electrode, means for passing oxidizing gas into dual contact with electrolyte and oxygen electrode and means for recovering electrical energy generating in such cell. The terms "anode" and "fuel electrode" are used interchangeably herein as are the terms "cathode" and "oxygen electrode."

In the operation of a fuel cell having an acid electrolyte and employing a liquid carbonaceous fuel, the fuel is brought into contact with an anode at an interface formed by such electrode and the electrolyte. A catalyst also present at such juncture promotes the release of electrons to the anode surface and the simultaneous formation of positive ions which combine with negatively charged ions formed at the cathode forming carbon dioxide and water. An appropriate catalyst is likewise present at an interface formed by the cathode and electrolyte and to this juncture is passed an oxidizing gas to complete the requisites for the half-cell reaction associated with the cathode.

It has now been discovered that when an aqueous sulfuric acid comprising electrolyte is employed in a fuel cell a surprising increase in the rate of electrochemical oxidation of such fuel can be obtained if the concentration of acid in the electrolyte is maintained within certain critical limits. Thus, acid concentration of an aqueous sulfuric acid electrolyte in direct contact with a combustible fuel should be maintained in the range of about 0.2 to 0.8, preferably 0.3 to 0.6, moles per liter. Where the cell is designed to provide a separation of anolyte and catholyte the aforementioned range is applicable to the anolyte and, though satisfactory, does not necessarily control the concentration of acid in the catholyte wherein a higher concentration may accelerate the half-cell reaction associated with the cathode.

Fuel cells employing an acid electrolyte may be designed to utilize either an organic gas or liquid fuel or other combustible gases, such as hydrogen. Both gas and liquid fuels may be introduced to the site of anodic reaction by diffusion through a porous anode. In a diffusion feed system of this type the fuel may be reacted upon reaching the electrolyte at a surface of the anode and unreacted fuel need not enter the electrolyte if the flow of fuel is regulated to admit fuel only as reaction occurs. In the alternative a liquid fuel that is soluble in the electrolyte may be introduced into solution with the electrolyte obviating the necessity of using a diffusion type anode or fuel electrode. Methanol is an example of a fuel suitable for use in solution with the electrolyte.

It has now been found that when methanol is employed as the organic fuel, the highest rate of production of electrical energy is attained by maintaining the concentration of such fuel in the electrolyte or anolyte within certain critical limits. Thus, a surprising increase in reaction rate is achieved if the concentration of methanol is maintained in the range of about 0.3 to 1.6, preferably 0.5 to 1.5, moles per liter.

The structural components of a cell employing an acid electrolyte should be of acid resistant materials. Thus, suitable electrodes for the adsorption and deadsorption as ions of fuel and oxygen, respectively, include porous carbon skeletons impregnated with suitable catalytic material and noncorrosive metal structures. Catalysts suitable for use with sulfuric acid include gold, silver, metals of the platinum group and certain acid resistant compounds, e.g. cobalt molybdate, manganese molybdate, etc. The noble metals are preferred for use at the cathode. With certain active catalysts at the fuel electrode, e.g. platinum black, methanol in accordance with this invention has been completely converted to carbon dioxide and water and electrical energy at room temperature and atmospheric pressure. However, it should be understood that this invention is not dependent upon a choice of any particular catalyst. In the practice of this invention, one may use at the respective electrodes any of the anode and cathode catalysts known to the art for use at such electrodes in fuel cells having an acidic electrolyte. Naturally, there will be operable catalysts which are better than others with any concentration of fuel in electrolyte or any concentration of acid. The improvements in reaction rates to be obtained by operation in accordance with this invention therefore will not be limited to any specific catalyst choice but rather will merely reflect and/or magnify the relative existing efficiencies of the cells wherein such technique is employed. Cell containers and all other structural parts coming in contact with the electrolyte may be of glass, stainless steel, noble metals or an acid resistant high molecular weight polymer, e.g. polypropylene, etc. The operation of an acid-type fuel cell will be more easily understood by referring to the accompanying drawing which represents a simple version of a single cell. It is to be understood, of course, that structural changes may be effected in the design of such a cell while maintaining all essential parts thereof so as to admit of a combination of such cells in a compact cell pack.

Referring now to the drawing wherein vessel 1 is a fuel cell container of corrosion-resistant material containing an electrolyte bath of aqueous sulfuric acid. Inside vessel 1 are positioned a porous cathode (oxygen electrode) 2, e.g. porous carbon impregnated with a metal of the platinum group and an anode (fuel electrode) 3, e.g. a metal sheet coated with platinum black. Electrodes 2 and 3 are spaced apart with each partially immersed in the electrolyte bath. Electrodes 2 and 3 are connected to an external electrical circuit represented here by wires 4 and 5 and a resistance means 6, e.g. an electric motor, light bulb, etc. The electrolyte is divided by an electrolyte separator 7, i.e. an ion exchange resin or an ion permeable membrane. Materials of this type are well known in the art and their use for this purpose does not comprise a part of this invention. The electrolyte surrounding the cathode 2 and that surrounding the anode 3 may therefore be referred to as the catholyte and the anolyte, respectively. In the operation of this cell a liquid carbonaceous fuel soluble in the anolyte is introduced directly into the anolyte via line 9 thereby bringing such fuel into dual contact with anode 3 and the surrounding anolyte. An oxidizing gas, e.g. air, undiluted oxygen, etc., is supplied via line 8 to the interior and hence to the reaction surfaces of porous cathode 2, so as to form a three-phase contact between the cathode, the catholyte and the oxidizing gas. When an enclosed cell is employed, the design may include an oxygen receiving chamber from whence the oxidizing gas may diffuse through a porous platelike cathode to the electrolyte. A closed cell will, of course, include means for introducing an oxidizing gas to the cathode and fuel to the anode. In other embodiments the fuel may be introduced to the electrolyte by diffusion through a porous anode. Cell divider 7 is employed in certain embodiments to prevent a soluble fuel from contacting a cathode where the mode of operation of such cathode will promote the normal anodic half-cell reaction of such fuel so as to reduce cell efficiency. Where this reaction can be minimized, e.g. by choice of catalyst, controlled preferential reaction of oxygen by oxygen pressure or flow rates, etc., divider 7 may be eliminated.

The following illustrative examples are submitted to more fully explain the instant invention and should not be construed as limitations upon the true scope of this invention as set forth in the claims.

EXAMPLE I

In a fuel cell similar to the cell shown in the accompanying drawing aqueous sulfuric acid electrolytes having different acid concentrations were tested. The tests were conducted at a room temperature of 74° F. at atmospheric pressure. The cathode employed was a porous carbon cylinder impregnated with a noble metal catalyst containing about 95% platinum and about 5% gold. The anode was a platinum sheet upon which had been electrodeposited platinum black. The concentration of methanol in the electrolyte in contact with the anode was maintained at about 1 mole per liter in all runs.

The results of cell activity achieved at different acid concentrations when current was drawn from the cell are set forth in Table I.

Table I

EFFECT OF ACID CONCENTRATION AT CONSTANT FUEL CONCENTRATION

| Sulfuric Acid Concentration in Anolyte | Maximum Amps./Ft.² (a) | Amps./Ft.² (a) at 0.6 Volt |
|---|---|---|
| 0.1 | 213 | 94 |
| 0.2 | 299 | 130 |
| 0.3 | 404 | 138 |
| 0.5 | 444 | 174 |
| 0.8 | 399 | 121 |
| 1.0 | 174 | 70 | a Anode superficial external area.

This demonstrates that to obtain a high rate of electrochemical activity with an aqueous sulfuric acid electrolyte, the acid concentration must be maintained within certain critical limits.

EXAMPLE II

The cell operatons of Example I were repeated with the difference that this time the acid concentration of the anolyte was maintained at a constant level, i.e. about 0.5 mole per liter $H_2SO_4$, and the methanol concentration of the anolyte was varied.

The results of cell activity achieved at different methanol concentrations in the anolyte when current was drawn from the cell are set forth in Table II.

Table II

EFFECT OF METHANOL CONCENTRATION AT CONSTANT ACID CONCENTRATION

| Methanol Concentration in Electrolyte | Maximum Amps./Ft.² (a) | Amps./Ft.² (a) at 0.6 Volt |
|---|---|---|
| 0.1 | 68 | 48 |
| 0.3 | 357 | 164 |
| 0.5 | 410 | 174 |
| 1.0 | 444 | 174 |
| 1.5 | 434 | 174 |
| 1.6 | 299 | 130 |
| 2.0 | 72 | 51 |
| 3.0 | 36 | 21 | a Anode superficial external surface.

This demonstrates that when methanol is used as the organic fuel with an aqueous sulfuric acid electrolyte of a fixed concentration the rate of electrochemical activity in the cell is dependent upon maintaining a methanol concentration within critical limits.

It should be understood that in most any industrial or commercial use of the fuel cell large numbers of such cells will be connected in series and/or parallel to provide practical power requirements. Many embodiments of the cell may be utilized to fit individual requirements. Carbon dioxide and water constitute products that must be removed to maintain efficient operation. Cells of this type may be operated at temperatures wherein excess water is vaporized and removed as formed, e.g. up to 300° F. or higher. Some alcohol will be carried out with such water. Escaping $CO_2$ may also carry off both methanol and water. Various techniques may be employed to recover fuel escaping in the effluent gases. For instance, a condenser may be employed so as to allow $CO_2$ to escape after which the alcohol-water liquid phase may be separated to allow a recycle of fuel to the cell. Methanol may also be separated from the effluent by passing the effluent stream through molecular sieves and heated air from the cell could be utilized for regeneration of the sieve bed. Such beds could be arranged in pairs for alternate adsorption and regeneration. Other methods would include passing the uncooled effluent through an oil scrubber and recovering the absorbed oxygenated materials to the cell by extraction with fresh or recycle acid electrolyte.

What is claimed is:

1. In a process for the direct production of electrical energy from methanol in a fuel cell comprising an anode and a cathode for the adsorption and deadsorption as ions of fuel and oxygen, respectively, leaving such electrodes electrically charged, an aqueous sulfuric acid electrolyte providing ionic conductance between said anode and said cathode, conduit means for introducing an oxygen gas into dual contact with said cathode and said electrolyte, conduit means for introducing said methanol into solution with said electrolyte and into dual contact with said anode and said electrolyte, conducting means establishing electrical contact of said anode and said cathode with an electrical circuit external to said electrolyte, recovering electrical energy generated in said cell, the improvement which comprises maintaining the concentration of said acid in said electrolyte in the range of about 0.2 to 0.8 mole per liter at a temperature in the range of about 74° to about 300° F. and the concentration of said methanol in said electrolyte in the range of about 0.3 to 1.6 moles per liter.

2. A process in accordance with claim 1 wherein the concentration of said acid is maintained in the range of 0.3 to 0.6 mole per liter.

3. A fuel cell for the direct production of electrical energy from methanol comprising a fuel electrode and an oxygen electrode spaced apart, an aqueous electrolyte solution providing ionic conductance between said fuel electrode and said oxygen electrode, said solution containing about 0.2 to 0.8 mole sulfuric acid per liter and 0.3 to 1.6 moles methanol per liter, means for introducing oxygen gas into dual contact with said oxygen electrode and said electrolyte solution, means for introducing methanol to said electrolyte solution, and conducting means establishing external to said electrolyte an electrical circuit in electrical contact with said fuel electrode and said oxygen electrode.

References Cited in the file of this patent

UNITED STATES PATENTS

| | | |
|---|---|---|
| 2,384,463 | Gunn et al. | Sept. 11, 1945 |
| 2,901,522 | Bopp | Aug. 25, 1959 |

FOREIGN PATENTS

| | | |
|---|---|---|
| 521,773 | Great Britain | May 30, 1940 |